US 11,585,411 B2

(12) United States Patent
Smemo et al.

(10) Patent No.: US 11,585,411 B2
(45) Date of Patent: Feb. 21, 2023

(54) TORQUE DIVIDING ARRANGEMENT FOR A CIRCLE DRIVE

(71) Applicant: Deere & Company, Moline, IL (US)

(72) Inventors: Alfred S. Smemo, Dubuque, IA (US); Steven R. Whiteman, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 672 days.

(21) Appl. No.: 16/679,977

(22) Filed: Nov. 11, 2019

(65) Prior Publication Data

US 2021/0140514 A1 May 13, 2021

(51) Int. Cl.
| F16H 1/22 | (2006.01) |
| E02F 3/76 | (2006.01) |
| F16H 1/20 | (2006.01) |
| E02F 9/20 | (2006.01) |
| E02F 3/84 | (2006.01) |

(52) U.S. Cl.
CPC ............ *F16H 1/225* (2013.01); *E02F 3/7668* (2013.01); *E02F 3/844* (2013.01); *E02F 9/202* (2013.01); *F16H 1/203* (2013.01)

(58) Field of Classification Search
CPC ......... E02F 3/764; E02F 9/202; E02F 3/7668; E02F 3/844; E02F 3/7645; E02F 3/765; F16H 1/225; F16H 2047/025; F16H 1/203; Y10T 74/19828
See application file for complete search history.

(56) References Cited

U.S. PATENT DOCUMENTS

| 1,265,295 A | * | 5/1918 | Bonsieur | F16D 59/00 188/180 |
| 1,594,987 A | * | 8/1926 | Adams | F16H 1/225 74/432 |
| 1,676,428 A | * | 7/1928 | Davis | E21C 31/10 299/72 |
| 1,676,429 A | * | 7/1928 | Davis | E21C 31/00 299/72 |
| 2,007,900 A | * | 7/1935 | Osgood | E21C 31/00 299/72 |
| 2,007,902 A | * | 7/1935 | Maxson | E21C 31/00 299/72 |
| 2,007,905 A | * | 7/1935 | Osgood | E21C 31/00 299/72 |

(Continued)

*Primary Examiner* — Edwin J Toledo-Duran
(74) *Attorney, Agent, or Firm* — Klintworth & Rozenblat IP LLP (57) ABSTRACT

A circle drive for rotating a blade on a draft frame of a motor grader includes a circle gear mounting the blade, a worm wheel, a torque dividing arrangement, and a single input provided on a first shaft. The torque dividing arrangement includes a set of shafts positioned about the worm wheel, a torque dividing gear set, and a set of worm gears meshed with the worm wheel. The worm wheel is operatively coupled to drive the circle gear. The set of worm gears includes a first worm gear on a first shaft and a second worm gear on a second shaft. The single input is configured to provide a driving torque that drives the set of worm gears such that the set of worm gears divides the driving torque. The driving torque is capable of driving the worm wheel for driving the circle gear and rotating the blade.

18 Claims, 8 Drawing Sheets

(56) References Cited

U.S. PATENT DOCUMENTS

| | | | | |
|---|---|---|---|---|
| 2,007,906 A * | 7/1935 | Osgood | ............... | E21C 31/00 299/72 |
| 2,007,908 A * | 7/1935 | Osgood | ............... | E21C 31/00 299/72 |
| 2,075,819 A * | 4/1937 | Manly | ............... | B66C 23/84 212/175 |
| 2,075,954 A * | 4/1937 | Osgood | ............... | E21C 31/00 299/72 |
| 2,170,928 A * | 8/1939 | Levin | ............... | E21C 31/00 299/72 |
| 2,195,306 A * | 3/1940 | Henry | ............... | E02F 3/844 37/902 |
| RE21,514 E * | 7/1940 | Green | ............... | G11B 17/26 369/38.01 |
| 2,329,733 A * | 9/1943 | Watson | ............... | F16D 67/00 475/58 |
| 2,349,642 A * | 5/1944 | Watson | ............... | F16D 67/00 475/52 |
| 2,532,266 A * | 11/1950 | Andres | ............... | F16D 43/26 192/93 R |
| 2,570,444 A * | 10/1951 | Henkel | ............... | B23Q 16/022 409/165 |
| 2,928,381 A * | 3/1960 | MacDonald | ............... | E02F 3/764 91/186 |
| 3,739,189 A * | 6/1973 | Igarashi | ............... | G03B 23/06 307/117 |
| 4,122,903 A * | 10/1978 | Cole | ............... | E02F 3/80 74/413 |
| 4,206,818 A * | 6/1980 | Beckham | ............... | E02F 3/764 172/796 |
| 4,615,230 A * | 10/1986 | Guichard | ............... | H02K 7/1166 74/665 F |
| 4,796,412 A * | 1/1989 | O'Neill | ............... | B65B 43/123 53/473 |
| 5,030,185 A * | 7/1991 | Kawamura | ............... | F16H 48/29 475/248 |
| 5,135,442 A * | 8/1992 | Bossier, Jr. | ............... | F16H 1/222 475/343 |
| 5,142,989 A * | 9/1992 | Suzumori | ............... | G21C 17/017 346/33 P |
| 5,497,060 A * | 3/1996 | Juergens, III | ............... | B23Q 17/22 318/563 |
| 5,667,020 A * | 9/1997 | Palmer | ............... | E02F 3/765 74/448 |
| 6,658,954 B1 * | 12/2003 | Bosa | ............... | F16H 55/18 74/409 |
| 6,886,655 B2 * | 5/2005 | Varela | ............... | B60K 17/043 180/343 |
| 7,552,661 B2 * | 6/2009 | Diana | ............... | F16H 57/12 74/440 |
| 7,555,970 B2 * | 7/2009 | Hawkes | ............... | F16H 57/12 74/825 |
| 7,802,494 B2 * | 9/2010 | Batistic | ............... | F16H 37/065 74/665 B |
| 8,746,362 B2 * | 6/2014 | Bindl | ............... | E02F 9/202 172/795 |
| 9,644,341 B2 * | 5/2017 | Yoshimura | ............... | E02F 3/7645 |
| 10,190,505 B2 * | 1/2019 | Viel | ............... | F02C 7/32 |
| 11,230,820 B2 * | 1/2022 | Harshman | ............... | E02F 3/764 |
| 11,371,207 B2 * | 6/2022 | Yamaguchi | ............... | E02F 3/844 |
| 2003/0192400 A1 * | 10/2003 | Cordeiro | ............... | F16H 1/222 74/665 A |

* cited by examiner

TORQUE DIVIDING ARRANGEMENT FOR A CIRCLE DRIVE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to a circle drive for rotating a work implement of a work vehicle including, among other features, a torque dividing arrangement.

BACKGROUND OF THE DISCLOSURE

Work vehicles, such as used in the construction, agriculture, forestry, mining and other industries, may have various applications to support heavy-duty work implements that need to be very precisely moved and positioned (e.g., rotated) and then held in position against counteracting forces during use. One such application is a motor grader (also known as a road grader) that utilizes a large blade (e.g., 8-24 feet long) to move earth for initial rough work area (e.g., a road, sidewalk, etc.) preparation and/or subsequently to scrape a flat final base of a work area before a finishing surface material (e.g., asphalt, concrete, gravel, etc.) is applied to this base. In use, such a blade must be rotated to a desired angle in a generally vertical axis and then maintained at that angle to both create the desired flat final base and also to push and slide excess dirt aside while the work vehicle drives. To facilitate rotation of the work implement, the work vehicle may have a circle drive as part of an implement drive system that incorporates one or more power sources (e.g., motor(s), hydraulics, etc.) that cooperate with various gear assemblies to provide a gear ratio reduction to an output fixed to the work implement. To facilitate the demands of precision and high torque for a motor grader, the power source and gear assemblies transmit power to the work implement. A circular drive arrangement may have various embedded components including brakes, sensors, and electronic controls, to facilitate smooth operation and communication with an operator of the work vehicle.

SUMMARY OF THE DISCLOSURE

The disclosure provides a circle drive with a torque dividing arrangement to rotate a work implement on a work vehicle.

In one aspect, the disclosure provides circle drive for rotating a blade on a draft frame of a motor grader. The circle drive includes a circle gear configured to support the blade, a worm wheel, a torque dividing arrangement configured to distribute a driving torque to a plurality of locations about the worm wheel, and a single input element. The circle gear includes internal splines. The worm wheel is operatively coupled to the circle gear to drive the circle gear. The torque dividing arrangement has a set of shafts positioned about the worm wheel, a torque dividing gear set, and a set of worm gears meshed with the worm wheel. The set of shafts includes a first shaft and a second shaft. The torque dividing gear set is arranged on one or more of the set of shafts to rotationally couple the set of shafts to one another. The set of worm gears includes a first worm gear positioned on the first shaft and a second worm gear positioned on the second shaft. The single input element is provided on the first shaft and configured to provide a driving torque that drives the set of shafts, through the torque dividing gear set, and the set of worm gears to drive the circle gear and thus rotate the blade.

In another aspect, the disclosure provides a motor grader including a draft frame adjustably mounted on the motor grader; a blade; a circle drive mounted on the draft frame; and a single input element. The circle drive includes a circle gear rotationally fixed to the blade, a worm wheel, a set of shafts positioned about the worm wheel, a torque dividing gear set, a set of worm gears meshed with the worm wheel, and a single input element. The circle gear is mounted to the draft frame for rotation relative to the draft frame, and the circle gear includes internal splines. The worm wheel is operatively coupled to the circle gear to drive the circle gear. The set of shafts includes a first shaft and a second shaft. The torque dividing gear set is arranged on one or more of the set of shafts to rotationally couple the set of shafts to one another. The set of worm gears includes a first worm gear positioned on the first shaft and a second worm gear positioned on the second shaft. The single input element is provided on the first shaft and configured to provide a driving torque that drives the set of shafts, through the torque dividing gear set, and the set of worm gears to drive the circle gear and thus rotate the blade.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed circle drive, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "longitudinal," "radial," "axial," "circumferential," "lateral", and "transverse" may be used. Such terms are defined, at least in part, with respect to an axle of a draft frame, a circle drive, gear set component(s), a shaft, and/or a worm gear. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. Additionally, the terms "roll," "pitch," and "yaw" as used to indicate angles for rotating the work implement (e.g., blade) indicate orientations relative to the travel direction of the work vehicle and draft frame in the same manner that these orientations are conventionally defined relative to aircraft vehicles. The term "substantially" as used herein indicates values that are within ±5% of a given value.

Overview

Work vehicles with rotatable work implements, especially motor graders, require a powerful and precise circular drive for controlling the work implement (e.g., blade). For a motor grader, the blade is large and cumbersome. During initial stages of site preparation, large quantities of soil are moved. During final stages, the final base surface must be flat and precisely sloped over a large area and/or distance (e.g., several miles of roadway). At the same time, the motor grader must travel at sufficient speed to be productive while preventing unwanted bouncing and rocking; for example, a motor grader may work at a speed of about 3-7 miles per hour (mph). During use, the blade experiences resistive forces such as friction from the ground, weight of previously-loosened soil and debris material while it flows along the blade, and shock loads from obstacles. With a blade size that may range from 8-24 feet long and 1-3 feet tall, the weight of soil pushed by the whole blade at one time is significant. This load is transferred to supporting components that are relatively smaller than the blade, resulting in significant pressure on these components. These components may include individual teeth of gear components. Therefore, the blade and its supporting structure must provide precise control while being strong and robust. To achieve the requisite precision and power to position the blade, a rotational drive system is coupled to the blade. Modern graders may incorporate active automated control of the blade that continuously monitors both a work area and the load on a blade to determine whether adjustments in blade position must be made while working. These in-use adjustments may introduce additional loads on the blade.

A work area may be angled in various axes and may follow changing ground elevations. Accordingly, a motor grader blade may also be rotated to a desired angle in a horizontal longitudinal axis (i.e., the roll axis of the work vehicle) so that the work area is sloped or crowned as desired (e.g., to promote stormwater drainage). Finally, the blade may be rotated in a horizontal lateral axis (i.e., the pitch axis of the work vehicle) relative to the draft frame to control engagement of a tip of the blade with the ground and to control the flow of removed material off of the blade.

Certain conventional rotational drives for blades of motor graders may utilize a worm wheel driven by a single worm gear, focusing the torque load on one side of a worm wheel and on a small number of gear teeth of both the worm wheel and the worm gear. In other words, all of the torque in such a system is transferred at one mesh point between the worm gear and the worm wheel. A single mesh point may cause stress concentrations and reduce the useful life of a rotational drive or components thereof. Other conventional rotational drives may utilize two motors to drive a gear set at two location. This can complicate assembly and impose design trade-offs for certain components. Because two separate motors will not perfectly sync together and may experience different lag time in startup, the two gear sets will conflict and additional stresses on the drive are introduced. Likewise, a rotational drive with a differential may allow attached gear sets to rotate at different speeds while driving one implement. To account for the concentration of stresses on a worm wheel due to different driving speeds applied, one of the gear components of such a rotational drive may be designed as intentionally weaker (e.g., formed of bronze or other relatively weak material compared to the other gears) to serve as a sacrificial gear that may need frequent replacement.

The present disclosure provides a circle drive as part of an implement drive system for use in heavy-duty work vehicles that addresses these and other aspects of conventional arrangements. The circle drive is capable of achieving the requisite torque and position-holding characteristics by evenly dividing a driving torque about two or more mesh locations of a worm wheel in the circle drive. Driving power for the circle drive is provided from a single source.

In certain embodiments, the disclosed circle drive has a torque dividing arrangement driving two worm gears engaging a worm wheel. In another aspect, the disclosed torque dividing arrangement may incorporate a third worm gear such that the three worm gears are arranged about the worm wheel in a generally triangular fashion. Torque from a single input drives a first shaft having a first worm gear that is separately coupled to second and third shafts having second and third worm gears. In still another aspect, the disclosed torque dividing arrangement may incorporate a fourth worm gear, with the four worm gears arranged generally at right angles in a square about the worm wheel. Torque from a single input is divided in two branches, each branch having two worm gears. In any disclosed example, bevel gears (or other torque transfer linkages) are arranged between shafts that mount the worm gears resulting in consistent rotation of the worm gears and a substantially even division of torque load among each worm gear, reducing the stress on any single worm gear. This allows the torque to be applied to the worm wheel at multiple locations, reducing stress on individual teeth of the worm wheel.

The disclosed torque dividing arrangement may afford a circle drive driven via a single input from a single power source such as a motor while delivering multiple points of torque transfer to a worm wheel, resulting in a substantially even division of the driving torque from the single power source. In certain embodiments, the circle drive includes a bevel gear set for coupling a set of shafts having a set of worm gears. The set of worm gears provides the multiple points of torque transfer to a worm wheel. The bevel gear set is configured to evenly divide the driving torque. In certain embodiments, the circle drive includes either a single torque branch or two torque branches. When two torque branches are provided, a gear set proximate the input splits the two branches.

In still other embodiments, the circle drive disclosed may exhibit longer useful life with fewer repairs and simplified construction with lower costs. Certain gear teeth may be designed with lower material strength because of the plurality of mesh points. Worm gears may be constructed from a same material without designing for a sacrificial part of the circle drive. The circle drive of the present disclosure also exhibits improved accuracy in positioning the blade, repositioning the blade, and maintaining the blade position during use.

The following describes one or more example implementations of the disclosed circle drive. Discussion herein may sometimes focus on the example application of a circle drive for a circle gear in a draft frame of a motor grader, but the disclosed circle drive is applicable to other types of rotatable outputs and work implements in self-propelled or towed work vehicles, including various other construction machines (e.g., scrapers, plows, loaders, and the like) as well as various agriculture or forestry machines (e.g., agricultural tractors, balers, forestry skidders, and so on).

Example Embodiments of Work Vehicle and Torque Dividing Arrangement

Figure 1:
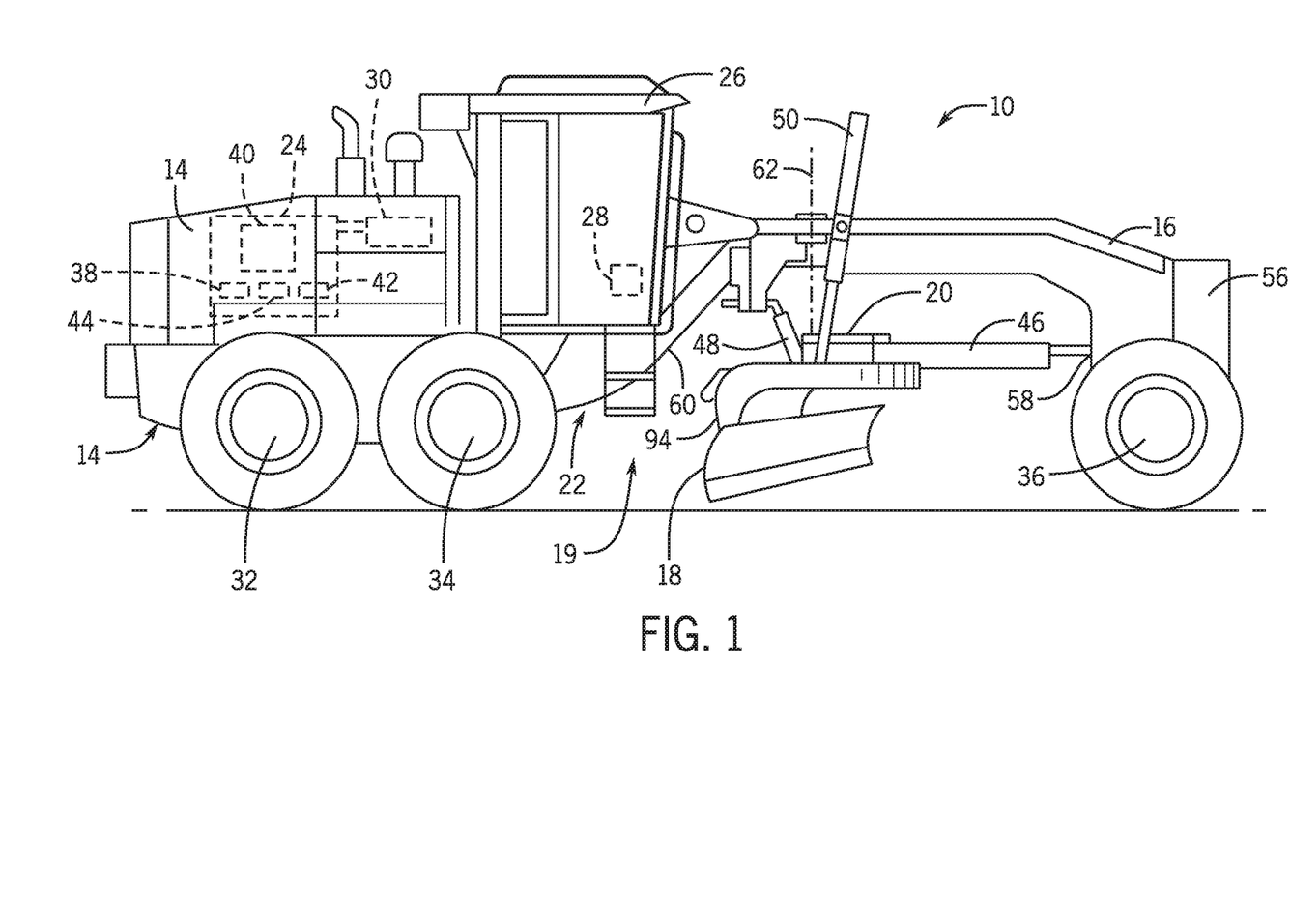
FIG. 1 is a simplified side view of an example work vehicle in the form of a construction tractor having a motor grader draft frame in which a circle drive may be used in accordance with this disclosure.

Referring to FIG. 1, in some embodiments, the disclosed work vehicle 10 may be a motor grader, although, as noted, the circle drive described herein may be applicable to a variety of machines, such as other construction vehicles, agricultural vehicles, and forestry vehicles. As shown, the work vehicle 10 may be considered to include a chassis 12 constituted by a rear frame 14 and a front frame 16 for carrying a blade 18. In one example, the work vehicle 10 may further be considered to include an implement drive system 19 that operates to move and control the blade 18 (or other work implement) relative to the front frame 16. In particular, the implement drive system 19 includes a circle drive 20 to rotate the blade 18. An articulated joint 22 connects the rear frame 14 and the front frame 16 to facilitate steering of the work vehicle 10. The work vehicle 10 may further be considered to include a drivetrain 24, an operator cabin 26, a control system 28, and a hydraulic system 30. The work vehicle 10 may be supported off the ground by ground-engaging wheels or tracks. In the illustrated example, the work vehicle 10 includes a first rear axle (not shown) on the rear frame 14 mounting a first set of wheels 32, a second rear axle (not shown) on the rear frame 14 mounting a second set of wheels 34, and a front axle (not shown) on the front frame 16 mounting a third set of wheels 36. It should be noted that any of the first set of wheels 32, second set of wheels 34, or third set of wheels 36 may be arranged with dual wheels on each left/right lateral side of the work vehicle 10. Likewise, one or more of the first, second, and third sets of wheels 32, 34, 36 may be configured to be steerable automatically or by operator control.

Generally, the drivetrain 24 has wheel steering components 38, including various devices (e.g., power steering pumps and lines, steering mechanisms, and the like) that couple manual (e.g., operator steering controls or wheel) and/or automated (via the control system 28) steering input to one or more of the sets of wheels, such as the third set of wheels 36. The drivetrain 24 may additionally or alternatively include various devices (e.g., steering mechanisms, hydraulic actuators, and the like) that couple manual and/or automated steering input to the articulated joint 22. The drivetrain 24 includes a source of propulsion, such as an engine 40, which supplies power to the work vehicle 10, as either direct mechanical power or after being converted to electric power (e.g., via batteries) or hydraulic power. In one example, the engine 40 is an internal combustion engine, such as a diesel engine, that is controlled by an engine control module (not shown) of the control system 28. It should be noted that the use of an internal combustion engine is merely an example, as the source of propulsion may be a fuel cell, an electric motor, a hybrid-gas electric motor, or other power-producing devices.

In addition to providing tractive power to propel the work vehicle 10, the engine 40 may provide power to various onboard subsystems, including various electrical and hydraulic components of the work vehicle, and for off-boarding power to other sub-systems remote from the work vehicle 10. For example, the engine 40 may provide mechanical power that is converted to an electric format to run the electronics of the control system 28 and one or more electric drives of the work vehicle 10. The drivetrain 24 thus may have mechanical to electrical power conversion components 42, one or more batteries 44, and associated electronics, including various alternators, generators, voltage regulators, rectifiers, inverters, and the like.

The engine 40 may also provide mechanical power that is converted to hydraulic format to power various pumps and compressors that pressurize fluid to drive various actuators of the hydraulic system 30 in order to power wheel steering and braking and various work implements onboard the work vehicle 10. In this example, the front frame 16 of the work vehicle 10 includes a draft frame 46 that is movable via a first actuator 48 and a second actuator 50 of the implement drive system 19. In one example, the first and second actuators 48, 50 are hydraulic piston-cylinder devices powered by the hydraulic system 30. The hydraulic system 30 may be coupled to and operated by the control system 28 in response to commands from an operator input device (e.g., operator controls, operator display device, etc.) in the operator cabin 26 or remote from the work vehicle 10. As detailed below, the hydraulic system 30 may also power an actuator 52, such as a hydraulic motor (e.g., a gerotor, axial piston motor, gear motor, etc.), that provides power to the circle drive 20. The actuator 52 may alternatively be any of a variety of power sources, such as one or more e-motors, power transmitted from the engine 40, and power transmitted from the hydraulic system 30. The hydraulic system 30 may include other components (e.g., valves, flow lines, pistons/cylinders, seals/gaskets, and so on), such that control of various devices may be effected with, and based upon, hydraulic, mechanical, or other signals and movements.

The control system 28 may be configured as a computing device with associated processor devices and memory architectures, as a hard-wired computing circuit (or circuits), as a programmable circuit, as a hydraulic, electrical, or electro-hydraulic controller. The control system 28 may be configured to execute various computational and control functionality with respect to the work vehicle 10, including various devices associated with the drivetrain 24, the hydraulic system 30, the implement drive system 19, the circle drive 20, and various additional components of the work vehicle 10. In some embodiments, the control system 28 may be configured to receive input signals in various formats (e.g., as hydraulic signals, voltage signals, current signals, and so on), and to output command signals in various formats (e.g., as hydraulic signals, voltage signals, current signals, mechanical movements, and so on). The control system 28 may also be configured to operate various aspects of the circle drive 20, which manipulates the blade 18.

As noted above, the hydraulic system 30 may be controlled by the control system 28 (automatically, via operator input, or both). The hydraulic system 30 may be powered by the engine 40 and configured in various arrangements to serve a plurality of hydraulic functions (e.g., operating first and second actuators 48, 50) including the function of operating the actuator 52 having a rotational output element 54. Accordingly, the hydraulic system 30 may have components (not shown) including a pump for supplying pressurized hydraulic fluid, a reservoir for storing hydraulic fluid, and various valves (e.g., a control valve) associated with each function.

The draft frame 46 of the front frame 16 of the work vehicle 10 mounts the blade 18 and includes structures to adjust the position of the blade 18. The draft frame 46 extends along the front frame 16 and is mounted to a front portion 56 of the front frame 16 at a joint 58 (e.g., a ball-and-socket joint), whereby the draft frame 46 can pivot and/or rotate relative to the front frame 16. The draft frame 46 is movably mounted to a rear portion 60 of the front frame 16 by one or more actuators. In one example, the first actuator 48 (e.g., a hydraulic side-swing actuator) and the second actuator 50 (e.g., a hydraulic vertical actuator or pair of hydraulic actuators on both lateral sides of the draft frame 46) both couple the draft frame 46 to the front frame 16. The circle drive 20 is configured to rotate the blade 18 about a rotation axis 62. Although the rotation axis 62 illustrated in FIG. 1 is a vertical yaw axis, the rotation axis 62 will pivot with the draft frame 46 when adjusted by one or more of the actuators 48, 50.

Figure 7:
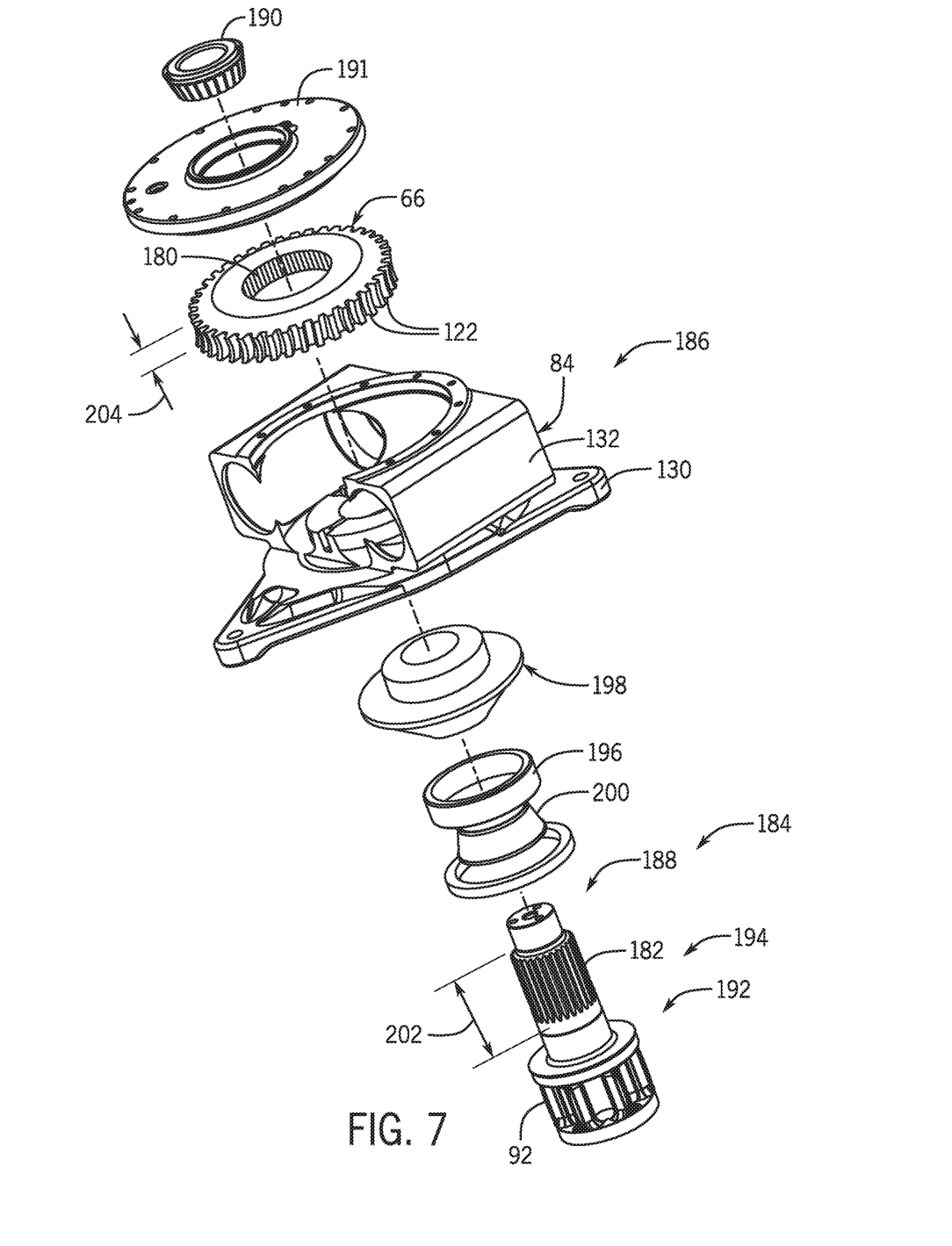
FIG. 7 is an exploded isometric view of a portion of the torque dividing arrangement of FIG. 4.
Figure 8:
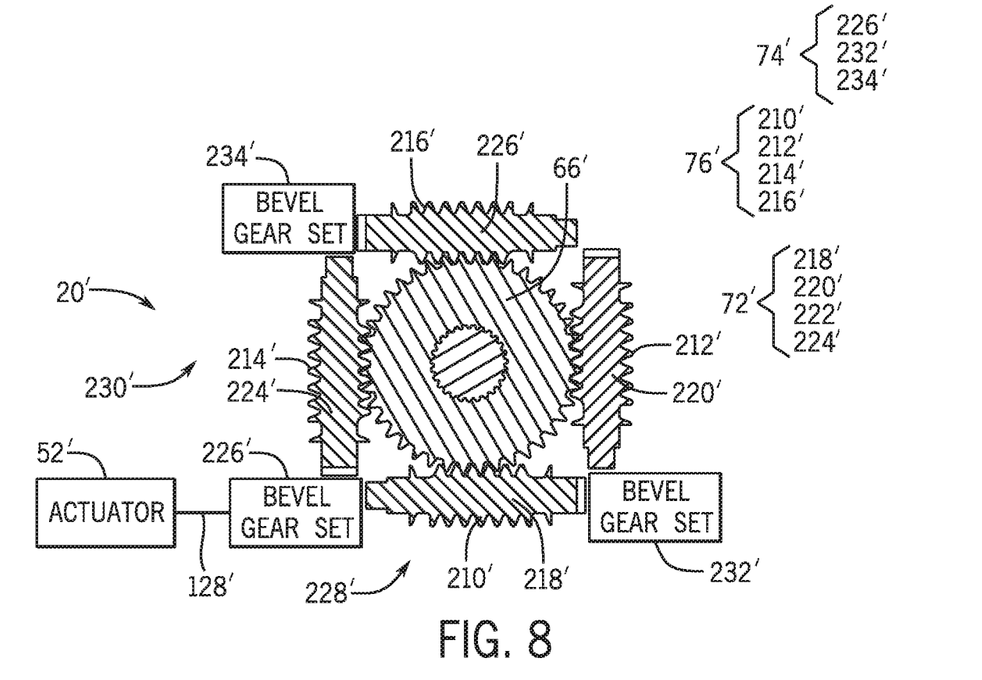
FIG. 8 is a top view of another example of a torque dividing arrangement for the example circle drive of FIG. 3A.
Figure 9:
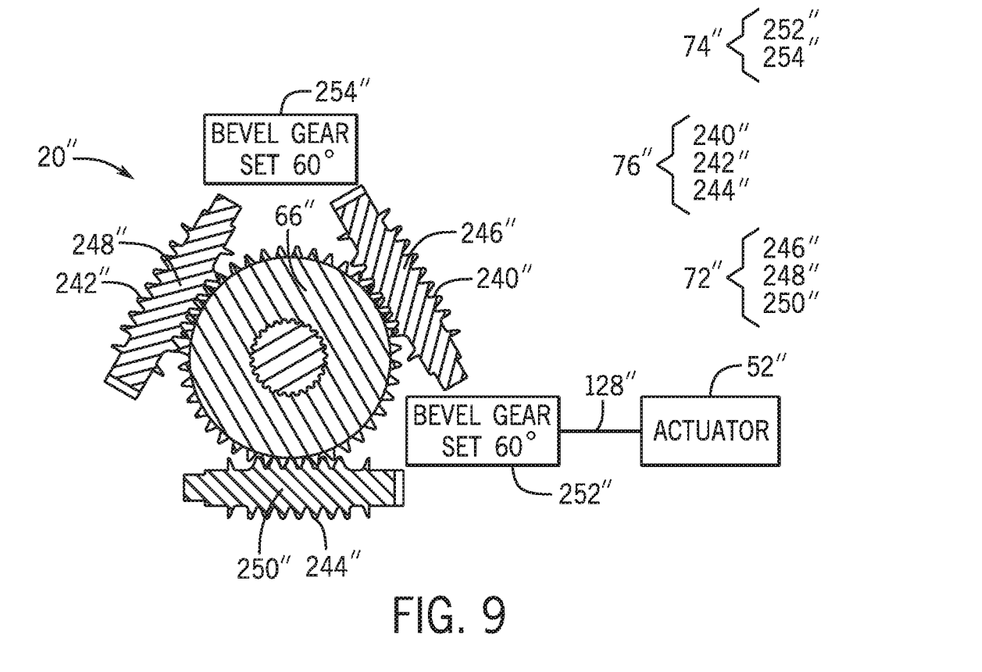
FIG. 9 is a top view of still another example of a torque dividing arrangement for the example circle drive of FIG. 3A.

As introduced above, the circle drive 20 is a component of the implement drive system 19 and functions to rotate the blade 18 relative to the draft frame 46. Examples of the circle drive 20 are discussed in greater detail with respect to FIGS. 2-8 in which the implement drive system 19 with the circle drive 20 is depicted schematically (FIG. 2), a portion of the draft frame 46 supporting the circle drive 20 is depicted in a top perspective view (FIG. 3A) and a bottom perspective view (FIG. 3B), the circle drive 20 is depicted in a perspective view (FIG. 4), the circle drive 20 is depicted in a top cross-sectional view (FIG. 5) and a side cross-sectional view (FIG. 6), and a portion of the circle drive 20 is illustrated in an exploded view (FIG. 7). Additional examples of circle drives applicable to the present disclosure are illustrated in a top view (FIGS. 8 and 9).

Figure 2:
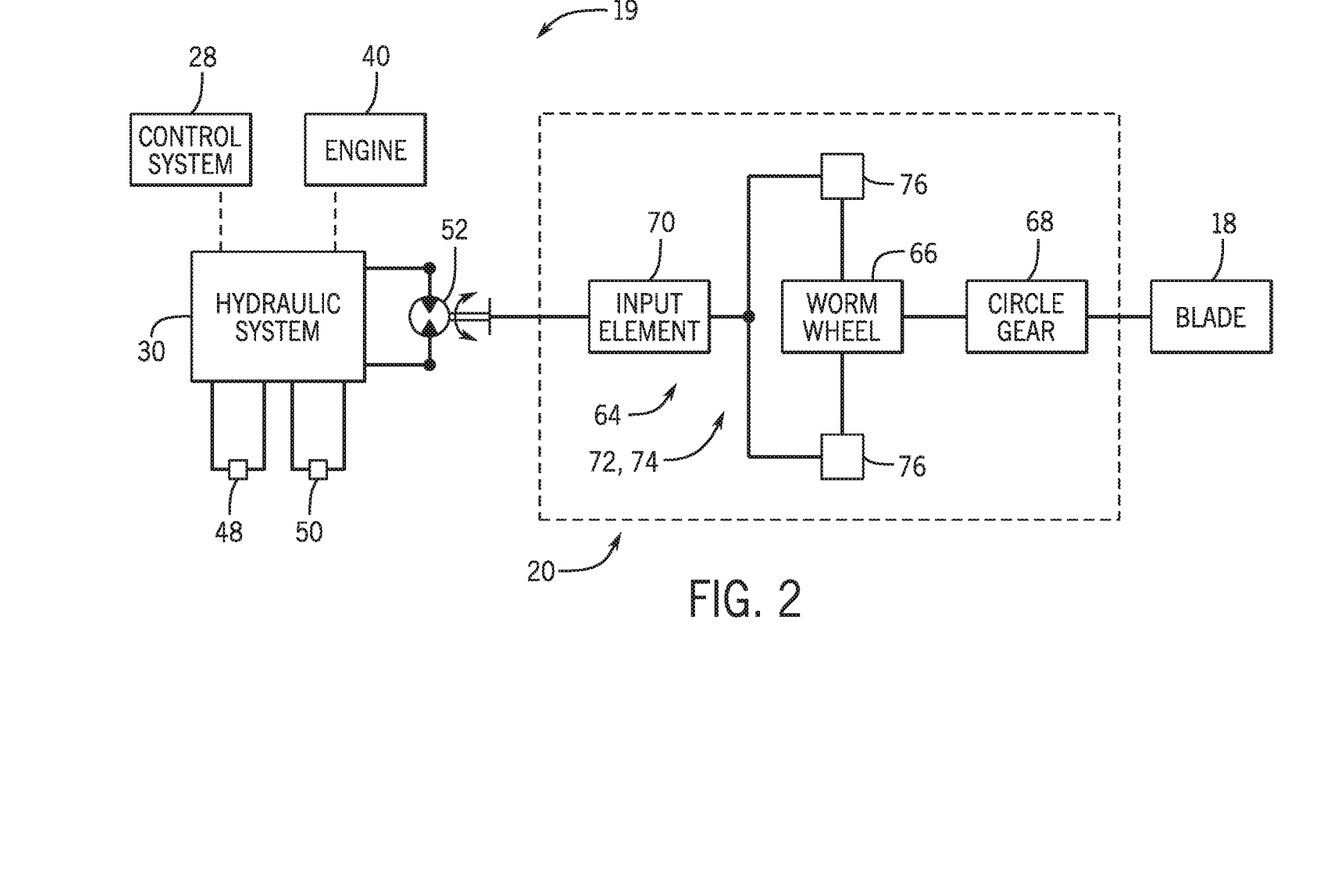
FIG. 2 is a schematic view of an example implement drive system of the work vehicle of FIG. 1.

Referring to FIG. 2, the implement drive system 19 is depicted as including the control system 28, the engine 40, hydraulic system 30, the actuators 48, 50, 52, and the circle drive 20 that collectively operate the blade 18. As noted above, the hydraulic system 30 drives the actuators 48, 50, based on power from the engine 40 and control signals from the control system 28 (automatically, via operator input, or both), and in turn, the actuators 48, 50 operate to reposition the blade 18 (e.g., via repositioning the draft frame 46 relative to the front frame 16 in multiple axes). As also shown in FIG. 2, the hydraulic system 30 drives the actuator 52 based on power from the engine 40 and control signals from the control system 28 (automatically, via operator input, or both). The actuator 52 is coupled to a circle drive 20 that operates to pivot the blade 18 via the circle drive 20. As described below, the circle drive 20 provides a torque dividing arrangement 64 that operates to divide the torque from actuator 52 approximately evenly to multiple locations about a worm wheel 66, which then drives a circle gear 68 coupled to the blade 18.

In one example, the actuator 52 provides a driving torque via the rotational output element 54 that is coupled to an input element 70 of the circle drive 20. The input element 70 is a component that transfers the driving torque, at a single location, to the torque dividing arrangement 64. The torque dividing arrangement 64 includes a set of shafts 72, a torque dividing gear set 74 (e.g., bevel gears), and a set of worm gears 76, as described in greater detail below.

In the illustrated example, the set of worm gears 76 includes two worm gears arranged about the periphery of the worm wheel 66. During operation, the set of worm gears 76 engages and drives the worm wheel 66, and the worm wheel 66 is coupled with the circle gear 68 for driving the circle gear 68. The circle gear 68 mounts the blade 18 for rotation with the circle gear 68. In this manner, the hydraulic system 30 supplies pressurized hydraulic fluid to the actuator 52 to rotate the set of worm gears 76, the worm wheel 66, the circle gear 68, and ultimately the blade 18. The rotation can be provided selectively in either of two opposing directions.

Figure 3A:
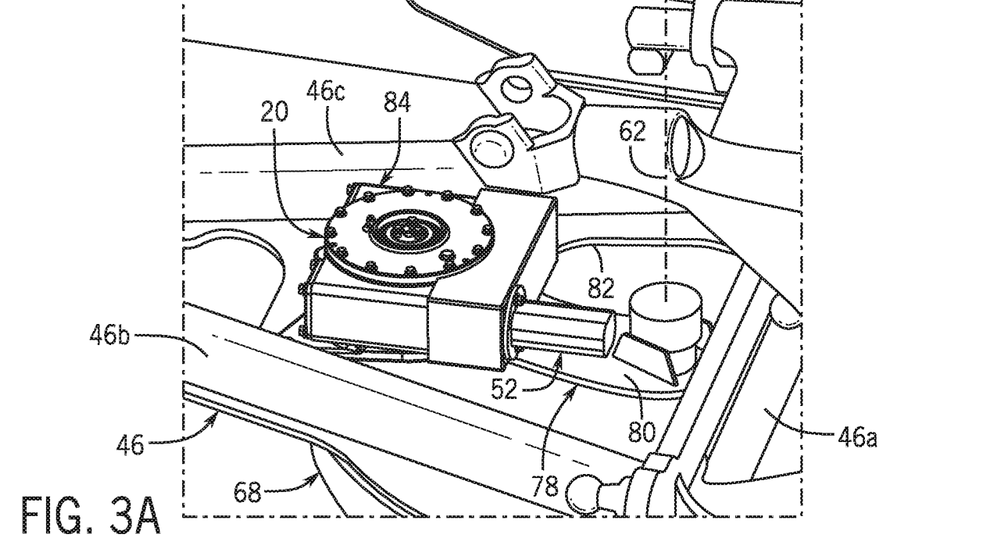
FIG. 3A is a partial top perspective view of a draft frame of the work vehicle of FIG. 1 implementing the circle drive.
Figure 3B:
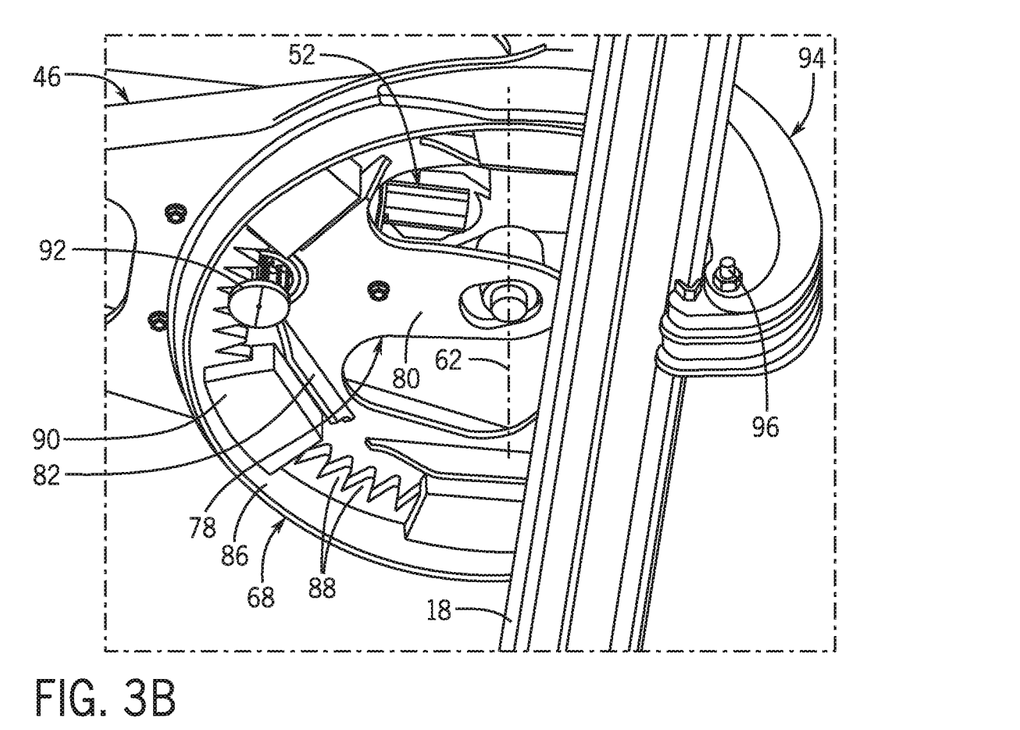
FIG. 3B is a partial bottom perspective view of a draft frame of the work vehicle of FIG. 1 implementing the circle drive.

Reference is now made to FIGS. 3A and 3B, which depict partial top and bottom perspective views, respectively, of the draft frame 46 that supports the circle drive 20 for selectively driving rotation of the circle gear 68, and thus rotation of the blade 18. In general, the circle drive 20 rotates the blade 18 relative to the draft frame 46 and likewise relative to the work vehicle 10. As shown, the draft frame 46 is generally triangular with a base 46a positioned rearward and two sides 46b, 46c extending to the joint 58 at the front portion 56 of the front frame 16. An upper mount 78 is fixed within the draft frame 46 and includes a central frame 80 and an annular frame 82. The upper mount 78 may be in one piece or an assembly of parts. The circle drive 20 is protected within the draft frame 46 and enclosed in a housing 84.

The circle gear 68 includes a downwardly extending annular flange 86 and internal splines 88 (FIG. 3B). A plurality of guides 90 extending from the annular frame 82 may be arranged about the circle gear 68 for protection and partial enclosure. As best shown by FIG. 3A, the upper mount 78 is suitable to mount the components of the circle drive 20, including the actuator 52 and an output gear 92 as detailed below. The blade 18 in this example is rotationally fixed to the circle gear 68 to rotate with the circle gear 68. As such, the blade 18 is driven by the circle drive 20 via rotation of the output gear 92. An arm assembly 94 connects the blade 18 to the circle gear 68 and may be configured to allow additional adjustment of the blade 18; for example, pivoting about a pitch axis at a joint 96.

As introduced above, the circle gear 68 is configured to rotate about a rotational axis 62 (e.g., a vertical yaw axis), although this rotational axis 62 may tilt away from vertical when the draft frame 46 is pivoted via one or both of the first and second actuators 48, 50. The output gear 92 of the circle drive 20 is a pinion gear that meshes with the circle gear 68 in a parallel axis arrangement. The output gear 92 extends downward from the circle drive 20 and below the upper mount 78. In the illustrated example, a majority of the circle drive 20 including the actuator 52 is positioned above the upper mount 78 while the output gear 92 extends downwardly therefrom as detailed below.

Figure 4:
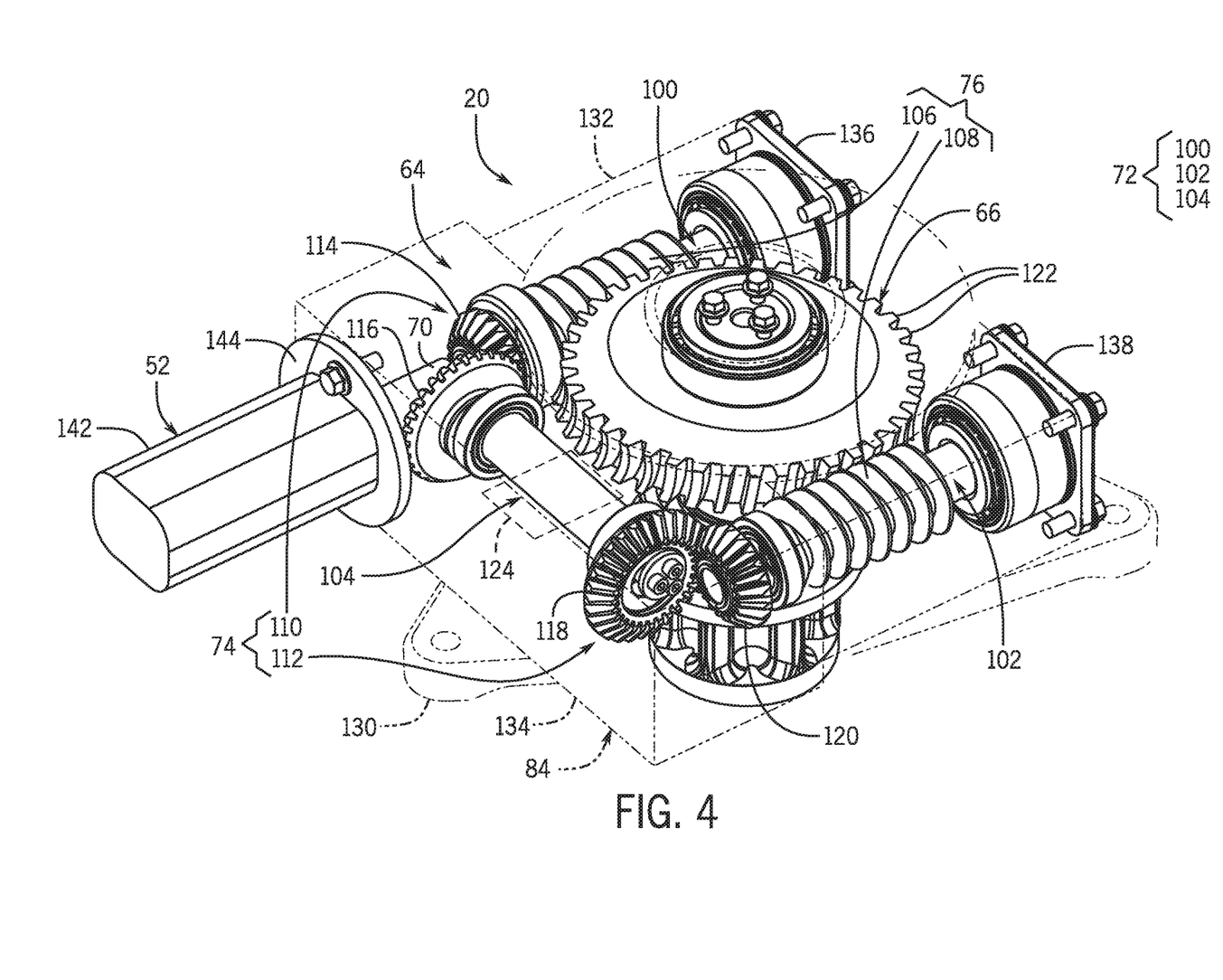
FIG. 4 is an isometric view of an example torque dividing arrangement for the circle drive of FIG. 3A.

The view of FIG. 4 depicts the circle drive 20 and the actuator 52 removed from the work vehicle 10. As represented by dashed lines in FIG. 4, most of the components of the circle drive 20 are arranged within a housing 84. The actuator 52 may be mounted on one side of the housing 84. As introduced above and discussed in greater detail below, the circle drive 20 receives the torque from the actuator 52 at the input element 70. The input element 70 is coupled to the torque dividing arrangement 64, which is collectively formed by the set of shafts 72, the torque dividing gear sets 74, and the set of worm gears 76. Generally, the torque dividing arrangement 64 operates to divide the torque from the input element 70 and transfer the divided torque to multiple positions about the worm wheel 66. The worm wheel 66 functions to drive the output gear 92, and as described above in reference to FIGS. 3A and 3B, the output gear 92 engages and drives the circle gear 68 and the blade 18 mounted thereon.

In one example, the set of shafts 72 includes a first shaft 100, a second shaft 102, and a third shaft 104; and the set of worm gears 76 includes a first worm gear 106 arranged on the first shaft 100 and a second worm gear 108 arranged on the second shaft 102 The third shaft 104 is implemented as a jackshaft in this example. As discussed in detail below referring to FIGS. 5 and 6, the set of shafts 72 is interconnected via the torque dividing gear sets 74 to transmit rotation and are mounted via rotational bearings. In this example, the torque dividing gear set 74 includes a first bevel gear set 110 and a second bevel gear set 112. The first bevel gear set 110 has first proximal bevel gear 114 on one end of the first shaft 100 and engaged with a third proximal bevel gear 116 on one end of the third shaft 104. The second bevel gear set 112 has a third distal bevel gear 118 on another end of the third shaft 104 engaged with a second proximal bevel gear 120 on one end of the second shaft 102. The input element 70 is non-rotationally fixed to the first proximal bevel gear 114. In other words, the input element 70 does not rotate relative to the first proximal bevel gear 114, but rather rotates with the first proximal bevel gear 114. As such, power from the actuator 52 flows from the output element 54 to the input element 70, to the first shaft 100 (including the first worm gear 106) and the first proximal bevel gear 114, to the third proximal bevel gear 116, to the third distal bevel gear 118, to the second proximal bevel gear 120, and to the second shaft 102 (including the second worm gear 108). As such, driving torque from the actuator 52 in this example is divided between the first worm gear 106 and the second worm gear 108, both of which engage the worm wheel 66. Additional details regarding the interconnections are discussed below.

The first, second, and third shafts 100, 102, 104 are arranged about the worm wheel 66 such that the first worm gear 106 and the second worm gear 108 are meshed with outer splines 122 of the worm wheel 66 to enable the transfer of power from the worm gears 106, 108 to the worm wheel 66. As a result, the worm wheel 66 may be driven by the worm gears 106, 108 at two positions around the worm wheel 66, even with the single input element 70 to the circle drive 20.

As noted above, in one example, the third shaft 104 may be considered a jackshaft that transfers torque from the first shaft 100 to the second shaft 102, without containing splines that engage with the worm wheel 66. In one alternative example, the third shaft 104 may transfer torque between the first and second shafts 100, 102 while additionally including a third worm gear 124 (shown schematically) positioned to mesh with the outer splines 122 of the worm wheel 66. As such, in this alternative example, the torque dividing arrangement 64 of the circle drive 20 divides the torque from the single input element 70 into three locations along the worm wheel 66 (e.g., to the first worm gear 106 to the second worm gear 108, and to the third worm gear 124).

In sum, the set of worm gears 76 includes the first worm gear 106 and second worm gear 108, and optionally, the third worm gear 124 and additional worm gear(s). The set of worm gears 76 is positioned on respective shafts of the set of shafts 72, which may be accomplished in by being integrally formed (e.g., formed from the same material by the same process at the same time) or by being an assembly of parts. It will be appreciated that various alternative arrangements of the set of shafts 72 (e.g., optional additional shaft(s)) and set of worm gears 76 about the worm wheel are contemplated, some of which are discussed in detail below.

As introduced above, the constituent parts of the circle drive 20 are mounted to a housing 84 that is fixed relative to the draft frame 46 to contain and protect the components from debris, weather, etc. The housing 84 may be integrally formed or may be an assembly of parts. In one example, the housing 84 includes a base 130, a main housing 132, a front housing 134, a first cap 136, a second cap 138, and a cover 140. The base 130 may be generally triangular to conform with the shape of the draft frame 46 (FIG. 2). An actuator enclosure 142 includes a mounting flange 144 for attachment to the front housing 134.

Figure 5:
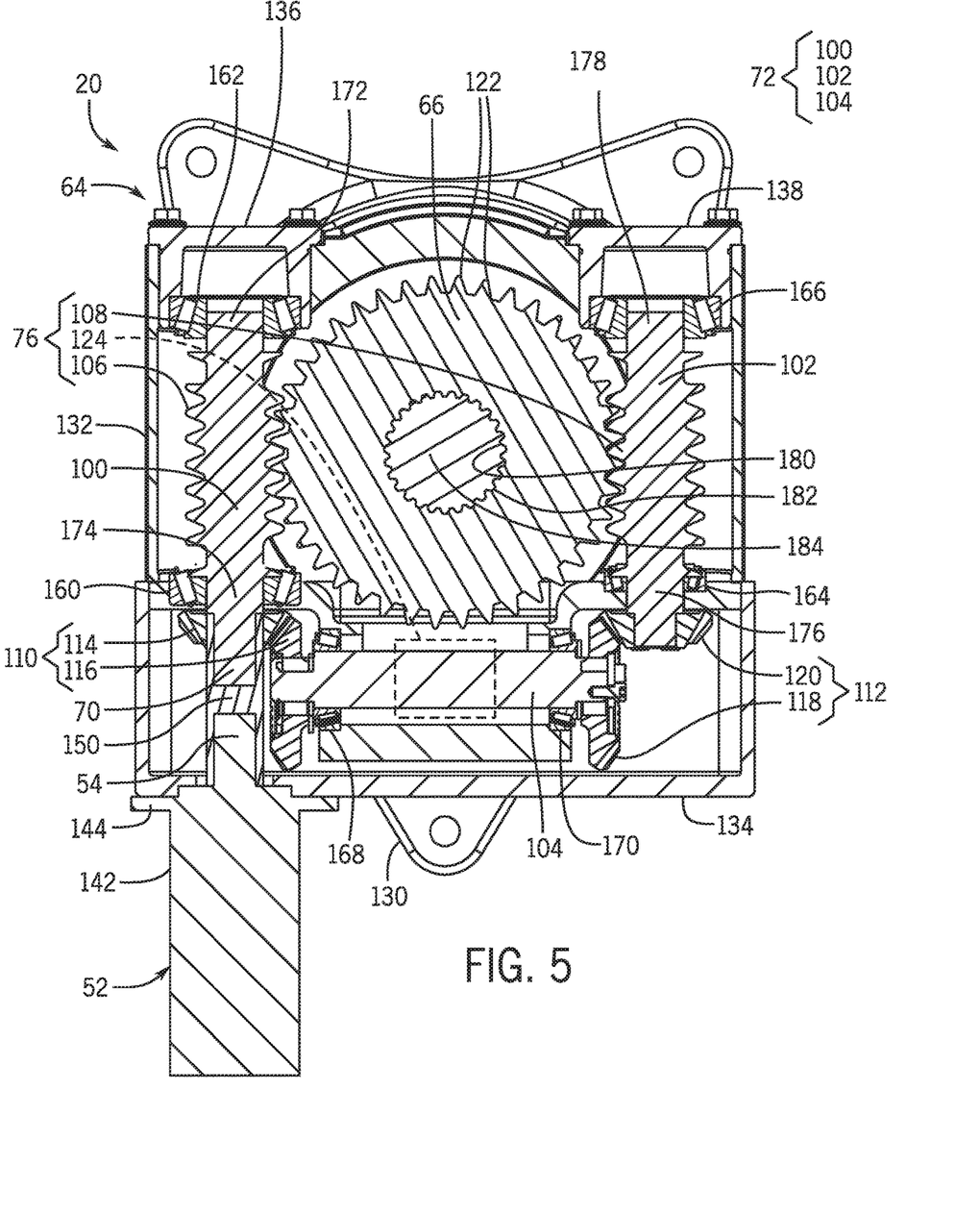
FIG. 5 is a top cross-sectional view of the torque dividing arrangement of FIG. 4.
Figure 6:
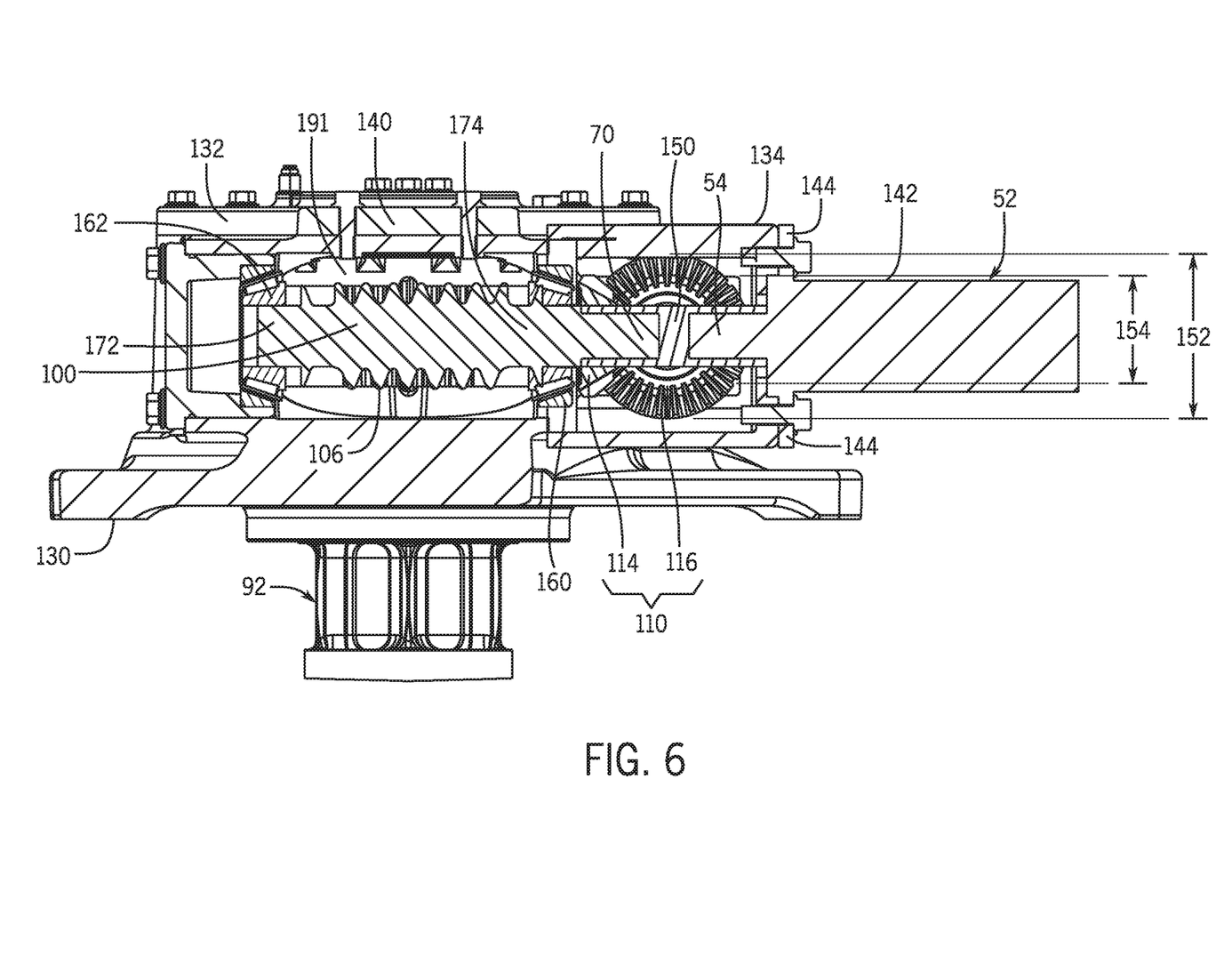
FIG. 6 is a side cross-sectional view of the torque dividing arrangement of FIG. 4.

Reference is now also made to FIGS. 5 and 6, which depict the circle drive 20 in cross-sectional views to illustrate an example of interconnections of the constituent parts. The first shaft 100 includes an input element 70 provided at a proximal end thereof. The input element 70 is axially aligned with and non-rotationally connected to the output element 54 of the actuator 52, for example by a coupler 150 or constant-mesh splines (not shown). As such, the input element 70 is configured to be driven directly by rotational output of the actuator 52. The input element 70 may be integrally formed with the first shaft 100, may be integrally formed within the first proximal bevel gear 114, or may be a separate part that is non-rotationally affixed to the first shaft 100. In any such implementation, the circle drive 20 includes only a single input element 70 and therefore only requires a single actuator 52. As such, the actuator 52 drives rotation of the input element 70 along with driving rotation of the first shaft 100 and the first worm gear 106. The input element 70 may be located and arranged at any desired location around the worm wheel 66, with the first shaft 100 correspondingly positioned and coupled to the remaining shafts of the set of shafts 72 in a manner that, during use, divides and redirects driving torque loads from the actuator 52 among each mesh point between the worm wheel 66 and the set of worm gears 76.

The input element 70 (and thus the actuator 52) is coupled to the set of shafts 72 by the torque dividing gear set 74. In the illustrated example the torque dividing gear set 74 includes two bevel gear sets with conical gears enmeshing to couple non-parallel shafts. Specifically, the torque dividing gear set 74 provides the first bevel gear set 110 coupling the first shaft 100 with the third shaft 104 and the second bevel gear set 112 coupling the third shaft 104 with the second shaft 102. More specifically, the first bevel gear set 110 includes the first proximal bevel gear 114 on the first shaft 100 coupled with the third proximal bevel gear 116 on the third shaft 104 and the second bevel gear set 112 includes the third distal bevel gear 118 on the third shaft 104 coupled with a second proximal bevel gear 120 on the second shaft 102.

The torque dividing gear set 74 may have various geometries and types of gears. In certain examples, each individual gear of the first and second bevel gear sets 110, 112 is arranged at a 45-degree angle relative to its respective shaft. The 45-degree angles allow 90-degree turns in transmission direction from shaft to shaft. The torque dividing gear set 74 is illustrated with consecutive shafts (e.g., first and third shafts 100, 104) substantially at right angles, although various other angles are contemplated to correspond to various arrangements for positioning the set of shafts 72 about the worm wheel 66. In the illustrated example with the third shaft 104 not having any worm gear, the third proximal bevel gear 116 and the third distal bevel gear 118 have a diameter 152 that is relatively larger (and thus, a relatively greater number of gear teeth) than a diameter 154 of respective mating gears in the first and second bevel gear sets 110, 112. However, the first proximal bevel gear 114 and the second proximal bevel gear 120 have the same diameter 154, which results in the first and second shafts 100, 102 and the set of worm gears 76 rotating at the same speed.

The set of shafts 72 are mounted for rotation in the housing 84 and may be supported by a variety of rotational bearings. In one example, a first proximal shaft bearing 160 and a first distal shaft bearing 162 mount the first shaft 100 (and thereby the first worm gear 106) to the housing. Similarly, second proximal and distal shaft bearings 164, 166 mount the second shaft 102 and third proximal and distal shaft bearings 168, 170 mount the third shaft 104. The shaft bearings 160, 162, 164, 166, 168, 170 each have outer rings affixed to a portion of the housing 84 (which is relatively fixed in place) and inner rings that co-rotate with the respective shaft. The shaft bearings 160, 162, 164, 166, 168, 170 may bear both axial (thrust) and radial loads, and therefore may be tapered rolling bearings (with roller elements between relatively rotatable inner and outer rings). On a particular shaft (e.g., on the first shaft 100), the respective proximal and distal shaft bearings (e.g., first proximal and distal shaft bearings 160, 162) are mounted with opposite axial orientations (e.g., opposite tapers) to accommodate axial loads in opposite axial directions. In certain examples, the first shaft 100 has a distal free end 172 at which the first distal shaft bearing 162 is larger relative to the first proximal shaft bearing 160 at a proximal end 174. In particular, the first distal shaft bearing 162 is axially larger and has larger rolling elements relative to the first proximal shaft bearing 160. The second shaft 102 may have similar relative sizes of the second proximal shaft bearing 164 at a proximal end 176 and the second distal shaft bearing 166 at a distal end 178. Because the respective distal ends 172, 178 of the first and second shafts 100, 102 do not have bevel gear components, there is a larger available envelope for mounting the bearing components within the caps 136, 138. Outer rings of the first and second distal shaft bearings 162, 166 abut shoulders of the caps 136, 138 of the housing 84 to further fix their axial mounting positions.

In use, the torque dividing gear set 74 is configured for simultaneous rotation of the set of shafts 72. In particular, the torque dividing gear set 74 is configured to allow the first shaft 100 and the second shaft 102 (and thus their respective worm gears 106, 108) to rotate at substantially the same speed to allow smooth rotation of the worm wheel 66. This rotation at substantially the same speed prevents tooth interference, knocking, etc. at mesh points between the set of worm gears 76 and the worm wheel 66. In alternative embodiments with a greater number of worm gears, each shaft with a worm gear must rotate at substantially the same speed.

In operation with the above-described arrangement, the circle drive 20 has the set of shafts 72 driven via the input element 70. The set of shafts 72 mount the set of worm gears 76 that are meshed with the outer splines 122 of the worm wheel 66. It should be appreciated that each of the set of shafts 72 is rotated in accordance with a desired rotational direction of the worm wheel 66. Accordingly, in the example of FIGS. 3 and 5, the first shaft 100 and the second shaft 102 rotate in opposite axial directions (e.g., clockwise and counterclockwise) because they engage opposite sides of the worm wheel 66. The worm wheel 66 includes an internal gear 180 that meshes with external splines 182 of a driveshaft 184 as further discussed below with reference to FIG. 7.

Through transmission in the torque dividing gear set 74, rotation of the input element 70 is converted to rotation of the set of shafts 72 and thus rotation of the set of worm gears 76. Each worm gear of the set of worm gears 76 is rotated at substantially the same speed. The driving torque from the actuator 52 is divided substantially evenly among the set of worm gears 76 that are mounted to the set of shafts 72. As such, the full driving torque from the actuator 52 is applied to the worm wheel 66, but a fraction of the driving torque is provided to any single mesh location between the worm wheel 66 and a respective worm gear of the set of worm gears 76. Accordingly, only a fraction of the driving torque is transferred to the outer splines 122 of the worm wheel 66 and the splines of each worm gear 106, 108. In the example of FIGS. 3-6 with only the first worm gear 106 and the second worm gear 108 engaging the worm wheel 66, driving torque from the actuator 52 (via the input element 70) is divided in half between the first worm gear 106 and the second worm gear 108. The driving torque from the actuator 52 is capable of driving the worm wheel 66 for driving the circle gear 68 and ultimately rotating the blade 18.

For the aforementioned alternative with the third shaft 104 having the third worm gear 124 (shown schematically in FIGS. 4 and 5), the torque dividing gear set 74 illustrated in FIGS. 4-6 may be implemented in other arrangements. In this alternative, all of the bevel gears 114, 116, 118, 120 will have an equal diameter (and equal number of teeth) to ensure a consistent rotational speed of the set of worm gears 76 (e.g., worm gears 106, 108, and 122) and thus smooth, synchronized engagement of each worm gear with the worm wheel 66. With this arrangement, the driving torque from the actuator 52 is divided in thirds among the first worm gear 106, second worm gear 108, and third worm gear 124.

The view of FIG. 7 depicts an example of a driveshaft subassembly 186 removed from the circle drive 20 in which the driveshaft subassembly 186 operatively connects the worm wheel 66 with the output gear 92 and subsequently the circle gear 68 to drive the circle gear 68. In particular, the driveshaft 184 is arranged coaxially with the worm wheel 66 in the rotation axis 62. An upper portion 188 of the driveshaft 184 has external splines 182 sized for a constant mesh with the internal gear 180 of the worm wheel 66. The upper portion 188 also may include various bearings and bushings, such as an upper axial thrust bearing 190 located above the external splines 182. The upper portion 188 of the driveshaft 184 is capped by a top 191 (and the cover 140 of the housing 84 shown in FIG. 6). A lower portion 192 of the driveshaft 184 non-rotationally mounts the output gear 92. A middle portion 194 of the driveshaft 184 may include various bearings and bushings mounted between the external splines 182 and the output gear 92. In one example, a radial bearing 196, a middle thrust bearing 198, and a lower axial thrust bearing 200 are mounted in the middle portion 194 of the driveshaft 184.

The external splines 182 of the driveshaft 184 have a height 202 that is greater than a height 204 of the internal gear 180 of the worm wheel 66. In one example, the height 202 of the external splines 182 is more than twice the height 204 of the internal gear 180. In some examples, this relatively greater height 202 of the external splines 182 may maintain the constant mesh with the internal gear 180 of the worm wheel 66, even if the driveshaft 184 moves axially relative to the worm wheel 66 (e.g., due to shock loads, the blade 18 striking an obstacle, etc.). In alternative examples to the illustrated constant mesh between the internal gear 180 and the external splines 182 may instead be a selectively-engaged mesh provided by a clutch pack. Accordingly, the output gear 92 is coupled to the worm wheel 66 via the driveshaft subassembly 186. In the illustrated example, the output gear 92 is coaxially aligned with the worm wheel 66 on the rotational axis 62. The output gear 92 is positioned below the worm wheel 66 and the base 130 and meshes with the internal splines 88 of the circle gear 68, which supports the blade 18.

In general, the circle drive 20 functions to receive power input from the actuator 52 and output power to the circle gear 68, and thereby the blade 18. The circle drive 20 provides the proper torque transfer from the actuator 52 to provide a precise positioning of the blade 18 before and during the operational travel of the work vehicle 10. For example, during final surface preparation, the circle drive 20 requires precise control (e.g., within 1 degree of a target angle) for the blade 18 to make precise fine adjustments while moving a relatively small amount of soil. During initial clearing of a work area, the circle drive 20 may require greater torque to hold the blade position while moving large amounts of soil, to adjust the blade position while driving (e.g., to shed excess soil), and/or to travel over unseen obstacles. Subsequently during final surface preparation, the circle drive 20 requires precision in positioning the blade 18 and sufficient torque to precisely maintain its position.

The set of worm gears 76 are advantageously positioned about the worm wheel 66 to provide multiple mesh points and multiple locations for transferring driving torque. The disclosed arrangement of the set of shafts 72 and the torque dividing arrangement 64 divide a driving torque substantially evenly. This even division of driving torque reduces stresses on the constituent parts and allows for improved control. Moreover, the circle drive 20 exhibits a robust and balanced route for transmission of torque to the worm wheel 66 and ultimately the blade 18.

In some embodiments, the circle drive 20 described above may be implemented with a set of shafts and a torque dividing gear set having an alternative mounting configuration, such as the circle drive 20' depicted in the example of FIG. 8. Unless otherwise noted, the circle drive 20' of FIG. 8 is similar to the circle drive 20 described above with reference to FIGS. 2-7. As shown in FIG. 8, the circle drive 20' provides a set of worm gears 76' with four worm gears (first worm gear 210', second worm gear 212', third worm gear 214', and fourth worm gear 216') positioned on the set of shafts 72' (first shaft 218', second shaft 220', third shaft 222', and fourth shaft 224'). The set of worm gears 76' are evenly spaced about the worm wheel 66' in a generally square shape. A torque dividing gear set 74' connects the set of shafts 72'. In contrast to the torque dividing gear set 74 of FIGS. 3-7, the torque dividing gear set 74' has a bevel gear set 226' that provides two branches 228', 230' of driving torque. In this manner, the circle drive 20' has a set of worm gears 76' including a first branch 228' (with first and second worm gears 210', 212' connected by a second bevel gear set 232') and a second branch 230' (with third and fourth worm gears 214', 216' connected by a third bevel gear set 234'). Because the first and second branches 228', 230' have an equal number of worm gears (e.g., two worm gears on each branch), the driving torque from the actuator 52' is divided evenly between the branches 228', 230' and among the set of worm gears 76'.

In other embodiments, the circle drive may have another alternative mounting configuration, such as the circle drive 20'' depicted in the example of FIG. 9. As shown in FIG. 9, the circle drive 20'' provides a set of worm gears 76'' with three worm gears (first worm gear 240'', second worm gear 242'', and third worm gear 244'') positioned on the set of shafts 72'' (first shaft 246'', second shaft 248'', and third shaft 250''). The set of worm gears 76'' are evenly spaced about the worm wheel 66'' in a generally triangular shape, e.g., with the set of shafts 72'' disposed at 120-degree angles. A torque dividing gear set 74'' (including a first bevel gear set 252'' and a second bevel gear set 254'') connects the set of shafts 72''. The first and second bevel gear sets 252'', 254'' produce 120-degree angle, and as such the individual bevel gears are angled at 60 degrees relative to their respective shafts. In this example, driving torque from the actuator 52'' is divided evenly in thirds among the set of worm gears 76''.

In still other examples, instead of being hydraulically powered, the actuator 52 may be an e-motor that is powered by, or part of, the drivetrain 24 and receives power from the prime power source of the work vehicle 10. In some embodiments, the prime power source is the engine 40, which provides mechanical power that is converted to electrical power through the power conversion components 42 (e.g., one or more main or dedicated alternators or generators) and the one or more batteries 44 of the drivetrain 24. The power conversion components 42 of the drivetrain 24 may convert the mechanical power from the engine 40 into either alternating or direct current (AC or DC) electrical power. Associated power electronics (e.g., rectifiers, inverters, voltage regulators and amplifiers) may be employed to convert between AC or DC format and provide the necessary voltage and current according to the power requirements of the actuator 52. DC electrical power may be stored in the one or more batteries 44.

The foregoing describes one or more example circle drives in detail. Various other configurations are possible within the scope of this disclosure. For example, the above-described draft frame 46 may be replaced with a drawbar extending similarly along the front frame 16. The first and second actuators 48, 50 for positioning the draft frame 46 may be provided as any type of actuator (e.g., electromechanical) and may be mounted in a variety of locations about the rear frame 14 and front frame 16, so long as the first and second actuators 48, 50 have suitable leverage to provide the desired range of motion for the draft frame 46. Although the examples of the set of worm gears 76, 76', 76'' are illustrated as evenly spaced about the worm wheel 66, the worm gears may instead be unevenly spaced while still providing the benefits noted herein. The disclosed bevel gear sets 110, 112 may be provided with any tooth type such as straight, spiral, zerol, or hypoid. The bevel gears may be replaced by other gear sets that change transmission direction, such as spur or helical gears. The disclosed circle drive 20 is driven by an actuator 52 that is a single hydraulic motor coupled to the input element 70, although, as noted, the input element 70 of the circle drive 20 described herein may be powered by a variety of power sources, such as e-motors, power transmitted from the engine 40, and power transmitted from the hydraulic system 30.

Enumerated Examples of Work Vehicle and Torque Dividing Arrangement

Also, the following examples are provided, which are numbered for easier reference.

1. A circle drive for rotating a blade on a draft frame of a motor grader, includes: a circle gear for mounting the blade, the circle gear including internal splines; a worm wheel operatively coupled to the circle gear to drive the circle gear; a torque dividing arrangement configured to distribute a driving torque to a plurality of locations about the worm wheel, the torque dividing arrangement comprising: a set of shafts positioned about the worm wheel, including a first shaft and a second shaft; a torque dividing gear set arranged on one or more of the set of shafts to rotationally couple the set of shafts to one another; and a set of worm gears meshed with the worm wheel, including a first worm gear positioned on the first shaft and a second worm gear positioned on the second shaft; and a single input element provided on the first shaft, the single input element configured to provide a driving torque that drives the set of shafts, through the torque dividing gear set, and the set of worm gears to drive the circle gear and thus rotate the blade.

2. The circle drive of example 1, further comprising an output gear mounted coaxially to the worm wheel, the output gear being meshed with the internal splines of the circle gear to provide the operative connection from the worm wheel to the circle gear.

3. The circle drive of example 1, wherein the set of shafts includes a third shaft coupled to the first shaft and coupled to the second shaft, the third shaft configured to be rotationally driven by rotation of the first shaft, and the third shaft configured to rotationally drive rotation of the second shaft.

4. The circle drive of example 3, wherein the torque dividing gear set comprises a first bevel gear set coupling the first shaft with the third shaft; and a second bevel gear set coupling the third shaft with the second shaft.

5. The circle drive of example 3, wherein the set of worm gears further includes a third worm gear positioned on the third shaft.

6. The circle drive example 5, wherein the set of shafts including a fourth shaft and the set of worm gears including a fourth worm gear positioned on the fourth shaft.

7. The circle drive of example 1, wherein the set of worm gears is configured to divide the driving torque from the input substantially evenly between each of the set of worm gears for driving the worm wheel.

8. The circle drive of example 1, wherein the single input is powered by an actuator that is a sole torque input to the circle drive, and wherein each worm gear of the set of worm gears bears a substantially equal tooth load while transferring the driving torque to the worm wheel.

9. In further embodiments, a motor grader is provided that includes: a draft frame adjustably mounted on the motor grader; a blade; and a circle drive rotationally fixed to the blade and mounted on the draft frame for rotation relative to the draft frame, the circle gear including internal splines, a worm wheel operatively coupled to the circle gear to drive the circle gear, a set of shafts positioned about the worm wheel, including a first shaft and a second shaft, a torque dividing gear set arranged on one or more of the set of shafts to rotationally couple the set of shafts to one another; a set of worm gears meshed with the worm wheel, including a first worm gear positioned on the first shaft and a second worm gear positioned on the second shaft, and a single input provided on the first shaft, the single input element configured to provide a driving torque that drives the set of shafts, through the torque dividing gear set, and the set of worm gears to drive the circle gear and thus rotate the blade.

10. The draft frame of example 9, further comprising an output gear mounted coaxially to the worm wheel, the output gear being meshed with the internal splines of the circle gear to provide the operative connection from the worm wheel to the circle gear.

11. The draft frame of example 9, wherein the set of shafts includes a third shaft coupled to the first shaft and coupled to the second shaft, the third shaft configured to be rotationally driven by rotation of the first shaft, and the third shaft configured to rotationally drive rotation of the second shaft.

12. The draft frame of example 11, wherein the torque dividing gear set includes a first bevel gear set coupling the first shaft with the third shaft and a second bevel gear set coupling the third shaft with the second shaft. [0012] 13. The draft frame of example 11, wherein the set of worm gears includes a third worm gear positioned on the third shaft.

14. The draft frame of example 9, wherein the set of worm gears is configured to divide the driving torque from the input substantially evenly between each of the set of worm gears for driving the worm wheel.

15. The draft frame of example 9, wherein the single input element is driven by an actuator that is a sole torque input to the circle drive, and wherein each worm gear of the set of worm gears bears a substantially equal tooth load while transferring the driving torque to the worm wheel.

CONCLUSION

The examples discussed above result in a variety of benefits of the disclosed circle drive. For example, the torque dividing gear set provides the requisite torque to the worm wheel while utilizing only one actuator, and thereby the circle drive may be smaller, less expensive, more efficient, and may avoid stress concentrations that arise in conventional circle drives. The arrangement of the torque dividing gear set allows for torque to be substantially evenly divided among the set of worm gears and likewise evenly divided to multiple locations about the worm wheel. This arrangement also drives the worm gears to rotate at substantially the same speed. As a result, the worm gears may be made of a same material with a long wear life, reducing repairs and downtime and simplifying construction. Further, the divided torque provides direct and even control at the worm wheel and therefore provides improved control of the work implement such as a blade, even when reversing the rotational direction.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A circle drive for rotating a blade on a draft frame of a motor grader, comprising:
    a circle gear configured to support the blade, the circle gear including internal splines;
    a worm wheel operatively coupled to the circle gear to drive the circle gear;
    a torque dividing arrangement configured to distribute a driving torque to a plurality of locations about the worm wheel, the torque dividing arrangement comprising:
        a set of shafts positioned about the worm wheel, including a first shaft and a second shaft, and a third shaft coupled to the first shaft and the second shaft;
        a torque dividing gear set arranged on one or more of the set of shafts to rotationally couple the set of shafts to one another;
        a set of worm gears meshed with the worm wheel, including a first worm gear positioned on the first shaft and a second worm gear positioned on the second shaft; and
        a single input element provided on the first shaft; and
    a single actuator providing a sole torque input to the circle drive, the single actuator having an output element axially aligned and coupled with the single input element;
    wherein the single actuator provides driving torque directly to the single input element, and wherein the torque dividing gear set divides and redirects the driving torque to the second shaft via the third shaft in order to drive the set of worm gears to drive the circle gear and rotate the blade.

2. The circle drive of claim 1, further comprising an output gear mounted coaxially to the worm wheel, the output gear being meshed with the internal splines of the circle gear to provide the operative couple from the worm wheel to the circle gear.

3. The circle drive of claim 1, wherein the torque dividing gear set comprises a first bevel gear set coupling the first shaft with the third shaft; and a second bevel gear set coupling the third shaft with the second shaft.

4. The circle drive of claim 1, wherein the set of worm gears further includes a third worm gear positioned on the third shaft.

5. The circle drive of claim 4, wherein the third shaft is arranged at right angles to both the first shaft and the second shaft.

6. The circle drive of claim 4, wherein the first shaft, the second shaft, and the third shaft have a triangular arrangement about the worm wheel.

7. The circle drive of claim 4, wherein the set of shafts includes a fourth shaft and the set of worm gears includes a fourth worm gear positioned on the fourth shaft.

8. The circle drive of claim 1, wherein the set of worm gears is configured to divide the driving torque from the input element substantially evenly between each of the set of worm gears for driving the worm wheel.

9. The circle drive of claim 1, wherein each worm gear of the set of worm gears bears a substantially equal tooth load while transferring the driving torque to the worm wheel.

10. The circle drive of claim 1, wherein the input element is integrally formed with the first shaft and the input element has a coupler configured to non-rotationally attach the input element to the output element of the actuator.

11. A motor grader, comprising:
    a draft frame adjustably mounted on the motor grader;
    a blade; and
    a circle drive mounted on the draft frame, including:
        a circle gear rotationally fixed to the blade and mounted to the draft frame for rotation relative to the draft frame, the circle gear including internal splines,
        a worm wheel operatively coupled to the circle gear to drive the circle gear,
        a set of shafts positioned about the worm wheel, including a first shaft and a second shaft, and a third shaft coupled to the first shaft and the second shaft,
        a torque dividing gear set arranged on one or more of the set of shafts to rotationally couple the set of shafts to one another,
        a set of worm gears meshed with the worm wheel, including a first worm gear positioned on the first shaft and a second worm gear positioned on the second shaft, and
        a single input element provided on the first shaft, and
        a single actuator providing a sole torque input to the circle drive, the single actuator having an output element axially aligned and coupled with the single input element,
        wherein the single actuator provides driving torque directly to the single input element, and wherein the torque dividing gear set divides and redirects the driving torque to the second shaft via the third shaft in order to drive the set of worm gears to drive the circle gear and rotate the blade.

12. The motor grader of claim 11, further comprising an output gear mounted coaxially to the worm wheel, the output gear being meshed with the internal splines of the circle gear to provide the operative couple from the worm wheel to the circle gear.

13. The motor grader of claim 11, wherein the torque dividing gear set includes a first bevel gear set coupling the first shaft with the third shaft and a second bevel gear set coupling the third shaft with the second shaft.

14. The motor grader of claim 11, wherein the set of worm gears includes a third worm gear positioned on the third shaft.

15. The motor grader of claim 14, wherein the third shaft is arranged at right angles to both the first shaft and the second shaft.

16. The motor grader of claim 14, the set of shafts including a fourth shaft and the set of worm gears including a fourth worm gear positioned on the fourth shaft.

17. The motor grader of claim 11, wherein the set of worm gears is configured to divide the driving torque from the single input substantially evenly between each of the set of worm gears for driving the worm wheel.

18. The motor grader of claim 11, wherein each worm gear of the set of worm gears bears a substantially equal tooth load while transferring the driving torque to the worm wheel.

* * * * *